United States Patent
Fukuda et al.

(10) Patent No.: US 11,481,607 B2
(45) Date of Patent: Oct. 25, 2022

(54) FORECASTING MULTIVARIATE TIME SERIES DATA

(71) Applicant: International Business Machines Corporation, Armonk, NY (US)

(72) Inventors: Mari Abe Fukuda, Tokyo (JP); Kenichi Takasaki, Shibuya (JP); Yuka Sasaki, Kawasaki (JP); Shoichiro Watanabe, Tokyo (JP); Yasutaka Nishimura, Yamato (JP)

(73) Assignee: International Business Machines Corporation, Armonk, NY (US)

(*) Notice: Subject to any disclaimer, the term of this patent is extended or adjusted under 35 U.S.C. 154(b) by 160 days.

(21) Appl. No.: 16/917,972

(22) Filed: Jul. 1, 2020

(65) Prior Publication Data
US 2022/0004846 A1    Jan. 6, 2022

(51) Int. Cl.
*G06N 3/00* (2006.01)
*G06N 3/04* (2006.01)
*G06N 3/08* (2006.01)
*G06F 21/32* (2013.01)
*G06K 9/62* (2022.01)
*G06V 30/10* (2022.01)

(52) U.S. Cl.
CPC ........... *G06N 3/0454* (2013.01); *G06F 21/32* (2013.01); *G06K 9/6256* (2013.01); *G06N 3/0472* (2013.01); *G06N 3/08* (2013.01); *G06V 30/10* (2022.01)

(58) Field of Classification Search
CPC ...... G06N 3/0454; G06N 3/0472; G06N 3/08; G06F 21/32; G06K 9/6256; G06V 30/10
See application file for complete search history.

(56) References Cited

U.S. PATENT DOCUMENTS

| 11,042,677 B1* | 6/2021 | Fu ........................... G06F 30/27 |
| 2009/0040054 A1 | 2/2009 | Wang et al. |
| 2016/0101785 A1 | 4/2016 | Takahashi et al. |
| 2016/0318445 A1 | 11/2016 | Sugimoto |

(Continued)

FOREIGN PATENT DOCUMENTS

| CN | 110169770 A | 8/2019 |
| EP | 3859459 A1 * | 8/2021 ............. G06F 17/18 |

(Continued)

OTHER PUBLICATIONS

Goodfellow et al., "Generative Adversarial Nets", arXiv:1406.2661v1 [stat.ML] Jun. 10, 2014, 9 pages.

(Continued)

*Primary Examiner* — Khai M Nguyen
(74) *Attorney, Agent, or Firm* — David K. Mattheis; Maeve M. Carpenter

(57) ABSTRACT

Utilizing a trained generative adversarial network (GAN) model to cause a computer to output multivariate forecasted time-series data by providing a trained GAN model, the GAN model comprising dilated convolutional layers for receiving time-series multivariate data, receiving time-series multivariable biometric data, generating, using the GAN model, successive time series multivariate biometric data according to the time-series multivariate biometric data, determining an outcome according to the successive time-series multivariate biometric data, and providing an output associated with the outcome.

25 Claims, 5 Drawing Sheets

(56) References Cited

U.S. PATENT DOCUMENTS

| | | | |
|---|---|---|---|
| 2017/0305349 A1 | 10/2017 | Naboulsi | |
| 2020/0050894 A1 | 2/2020 | Park | |
| 2020/0327675 A1* | 10/2020 | Lin | G06T 7/194 |
| 2021/0125075 A1* | 4/2021 | Lee | G06V 10/82 |

FOREIGN PATENT DOCUMENTS

| | | |
|---|---|---|
| JP | 2015035081 A | 2/2015 |
| JP | 2017061192 A | 3/2017 |
| WO | 2019056257 A1 | 3/2019 |
| WO | 2020035728 A2 | 2/2020 |

OTHER PUBLICATIONS

Haufe et al., "EEG potentials predict upcoming emergency brakings during simulated driving", Journal of Neural Engineering, Jul. 28, 2011, 11 pages, vol. 8, IOP Publishing.

Koochali et al., "Probabilistic Forecasting of Sensory Data with Generative Adversarial Networks—ForGAN", arXiv:1903.12549v1 [cs.LG] Mar. 29, 2019, 13 pages.

Lew et al., "Single trial prediction of self-paced reaching directions from EEG signals", Frontiers in Neuroscience, Aug. 2014, vol. 8, Article 222, 13 pages, doi: 10 3389/fnins.2014.00222.

Well et al., "The NIST Definition of Cloud Computing", Recommendations of the National Institute of Standards and Technology, Special Publication 800-145, Sep. 2011, 7 pages.

Nissan, "Delivers more excitement and driving pleasure by detecting, analyzing and responding to driver's brainwaves in real time", Nissan Motor Company Global Website, retrieved from the Internet on Jul. 24, 2018, 2 pages.

Roy et al., "Deep learning-based electroencephalography analysis: a systematic review", Journal of Neural Engineering, 16 (2019) 051001 (37pp), revised May 30, 2019, Accepted for publication May 31, 2019, Published Aug. 14, 2019, 38 pages, <https://doi.org/10.1088/1741-2552/ab260c>.

Takasaki et al., "Preemptive Mitigation of Collision Risk", U.S. Appl. No. 16/205,718, filed Nov. 30, 2018, 40 pages.

Van Den Oord et al., "Wavenet: a Generative Model for Raw Audio", arXiv:1609.03499v2 [cs.SD] Sep. 19, 2016, 15 pages.

* cited by examiner

FORECASTING MULTIVARIATE TIME SERIES DATA

BACKGROUND

The disclosure relates generally to generating multivariate time series data. The disclosure relates particularly to predicting human activity using forecast multivariate time series data.

Predicting human motion prior to the motion being performed by a human may be identified by using an electroencephalogram (EEG). An EEG may detect brain activity (i.e., brain activity data) by measuring the electrical activity of the brain. Measuring electrical activity may be accomplished by using, for example, electrodes attached to the scalp of an individual. The electrodes may detect brain waves and an EEG machine may amplify the brain wave signals. An EEG signal is safe and non-invasive to measure. A non-invasive EEG may detect brain activity using a brain-computer interface (BCI) that may measure electroencephalogram signals (i.e., EEG signals). One measurement may include movement-related cortical potentials that may represent EEG activity of an individual before and after a voluntary movement. EEG data includes multivariate, multi-step, time-series brain wave data. (The data includes time-based sequences of sequential data points, each data point including multiple discrete variables for each of the left and right brain hemispheres.)

EEG research has evolved to enable ahead-of-time prediction of human motion that was not possible using biological factors. Known methods may use an EEG machine (e.g., an EEG headset or an EEG wireless headset) or EEG signals to detect driver preferences or discomforts to allow for the driving configuration in an autonomous driving mode to create, for example, driver assist movements that allow a better reaction time for drivers. Autonomous driving modes may also create a safe pattern that may align with driver expectations.

Generative adversarial networks (GAN) can be trained to generate outputs which are indistinguishable from real data points used in training the generator and discriminator of the GAN.

SUMMARY

The following presents a summary to provide a basic understanding of one or more embodiments of the disclosure. This summary is not intended to identify key or critical elements or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatuses and/or computer program products generate and utilize multivariate time-series biometric data.

Aspects of the invention disclose methods, systems and computer readable media associated with utilizing a trained generative adversarial network model for causing a computer to output multivariate forecasted time-series data by providing a trained generative adversarial network (GAN) model, the GAN model comprising dilated convolutional layers for receiving time-series multivariate data, receiving time-series multivariable biometric data, generating successive time series multivariate biometric data according to the time-series multivariate biometric data, determining an outcome according to the successive time-series multivariate biometric data, and providing an output associated with the outcome.

Aspects of the invention disclose methods, systems and computer readable media associated with utilizing a trained generative adversarial network (GAN) model to cause a computer to output multivariate forecasted time-series data by training a GAN model by providing a first vector comprising multivariate time-series data associated with a first time period to a GAN generator of the GAN model, generating, using the GAN generator, a second vector comprising multivariate time-series data associated with a second time period, providing the first vector and the second vector to a GAN discriminator of the GAN model, determining, using the GAN discriminator a discrimination result associated with the second vector, and adjusting a node weight of the discriminator according to the discrimination result. Further by providing the GAN model, the GAN model comprising dilated convolutional layers for receiving time-series multivariate data, receiving time-series multivariate biometric data, generating, by the GAN model, successive time series multivariate biometric data according to the time-series multivariate biometric data, determining an outcome according to the successive time-series multivariate biometric data, and providing an output associated with the outcome.

Aspects of the invention disclose methods, systems and computer readable media associated with utilizing a trained generative adversarial network (GAN) model to cause a computer to output multivariate forecasted time-series data by training a GAN model by providing a first vector comprising multivariate time-series data associated with a first time period to a GAN generator of the GAN model generating, using the GAN generator, a second vector comprising multivariate time-series data associated with a second time period providing the first vector and the second vector to a GAN discriminator of the GAN model determining, using the GAN discriminator a first discrimination result associated with the second vector, and adjusting a node weight of the discriminator according to the first discrimination result. Further by providing a third vector comprising multivariate time-series data associated with a second time period to the GAN discriminator, determining, using the GAN discriminator, a second discrimination result associated with the third vector and adjusting a node weight of the discriminator according to the second discrimination result, providing the GAN model, the GAN model comprising dilated convolutional layers for receiving time-series multivariate data, receiving time-series multivariate biometric data. generating, by the GAN model, successive time series multivariate biometric data according to the time-series multivariate biometric data, determining an outcome according to the successive time-series multivariate biometric data, and providing an output associated with the outcome.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
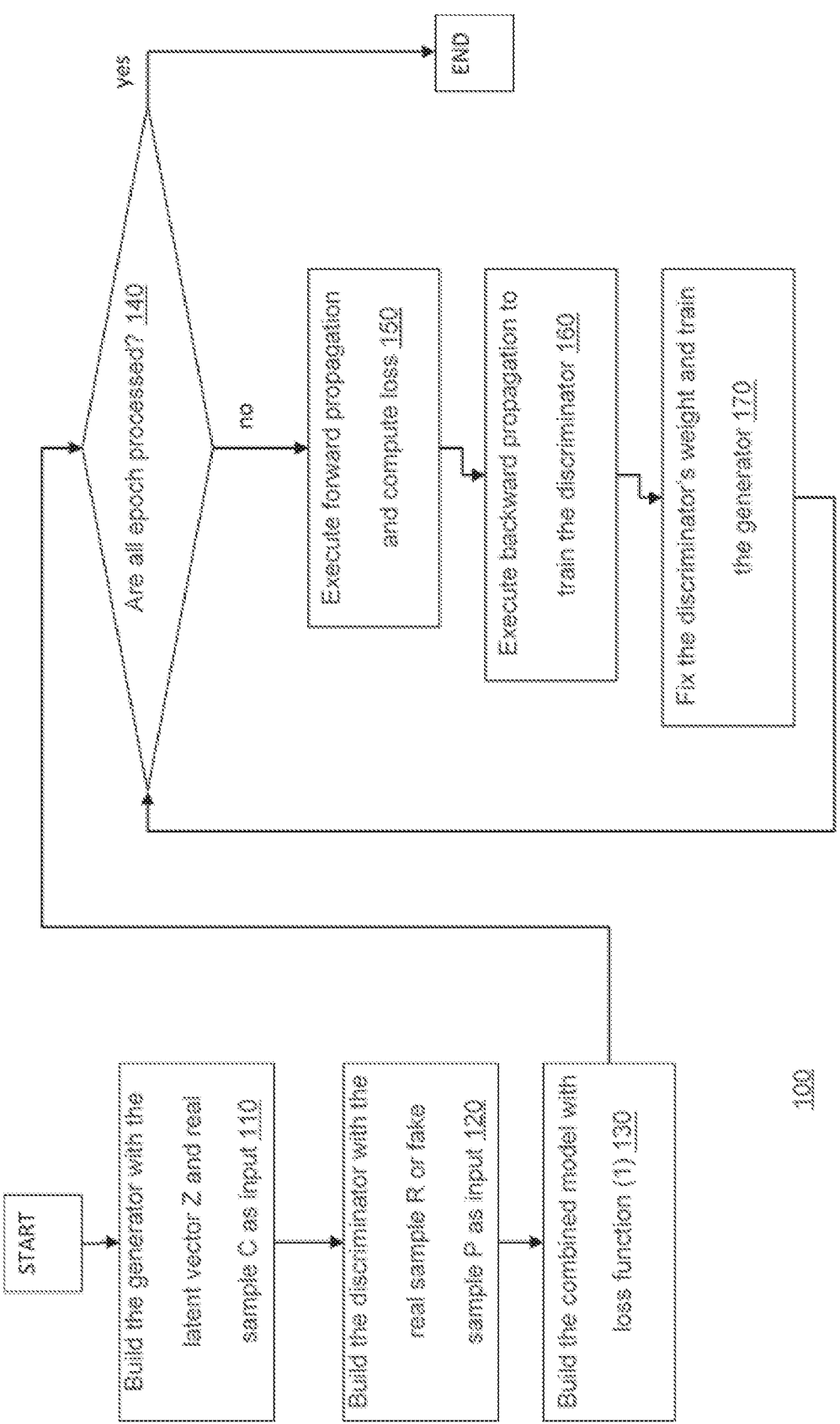
FIG. 1 provides a flowchart depicting operational steps in training a W-GAN, according to an embodiment of the invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

In an embodiment, one or more components of the system can employ hardware and/or software to solve problems that are highly technical in nature (e.g, training a W-GAN and utilizing the trained generator to create multivariate time-series data—such as EEG data, utilizing generated EEG data to predict subject motions, using predicted subject motions to alter vehicle controls, etc.). These solutions are not abstract and cannot be performed as a set of mental acts by a human due to the processing capabilities needed to facilitate the generation of time-series data, for example. Further, some of the processes performed may be performed by a specialized computer for carrying out defined tasks related to memory operations. For example, a specialized computer can be employed to carry out tasks related to generating multivariate time-series data or the like.

Generating (forecasting) multivariate, multi-step, time-series data, such as EEG data requires GAN architecture which has learned, and can generate, raw waveform features, and which can receive raw waveform data and generate raw waveform data for subsequent time steps. Disclosed methods and systems provide for the forecasting of subject biologic data, including EEG data, or Forecast EEG data, enabling subject motion predictions which can be used to alter vehicle or other operations, resulting in better outcomes.

Disclosed methods and systems provide W-GAN models capable of producing multivariate, time-series data maintaining the frequency aspects of input data. Such W-GAN models enable the prediction of data not only for EEG associated with subject motions, but also for EEG data associated with disease tendencies (e.g., epileptic seizures, brain damage, brain death). W-GAN models may support detection of recovery from stroke by detecting brain activity through comparison of actual and predicted EEG data, subject consciousness and concentration levels, as well as supporting the development of a brain/computing interface using the predicted data.

Disclosed W-GAN models which generate data having input data frequency components may provide predictive data for Magnetoencephalography (MEG), Functional near-infrared spectroscopy (fNIRS), Functional magnetic resonance imaging or functional MRI (fMRI), Electrocorticography (ECoG), Local field potentials (LFP), Electrocardiography (ECG), Electrooculography (EOG), Electromyograph (EMG) and so on. Disclosed W-GAN models enable the generation of time-series data predictive of the next step in any time-series data input—market trend predictions, etc.

In an embodiment, a trained W-GAN includes dilated convolutional layers—the dilated layers expand the sample set taken from generator inputs, leaving gaps in the selected sample. In this embodiment, the use of dilated convolutional layers in the generator network of the waveform generative adversarial network (W-GAN) enables the generator network to reproduce the frequency components of the target data more precisely. The W-GAN generator learns the input waveform data features through the use of the dilated convolutional layers of the generator and the W-GAN discriminator network utilized in training the generator.

FIG. 1 presents a flowchart 100 illustrating a method for training a W-GAN according to an embodiment of the invention. As shown in the figure, at block 110, the method configures the W-GAN generator using a latent vector Z, having z dimensions and consisting of noise, as well as real input variable time-series data set C, having a length of n dimensions (C consists of dimensional values $x_0$-$x_{n-1}$, where each value $x_t$ is multivariate time-series data at time t. The generator includes a convolutional neural network having dilated convolutional layers as described above. The generator provides a fake (generated) vector P, of length m-n, ($x'_n$, ... $x'_{m-1}$) as the next step of data in the series which includes real input vector C. Generated vector P consists of multivariate time-series data similar to the data of real input vector C. In an embodiment, the dilated layers of the generator memorize global and local features of the input data. In this embodiment, global features refer to features of a data series, such as the power spectrum of an individual determined from their time series data, local features refer to features associated with portions of time series data, e.g., 10 seconds, or 20 seconds of data, rather than the entire data set. The design of the final dense layer of the generator outputs the forecast time series data extending the input time-series data set C. In an embodiment, the concatenated input to a first dense layer has the format (?, 64) an input length of 64 bits, the first dense layer has an output of (?, 40) an output length of 40 bits, and a second dense layer receives the (?, 40) output from the first dense layer and has an output of (?, 128). In each instance the "?" indicates that the number of samples referred to in the input or output, is a wildcard value.

In an embodiment, each of the W-GAN generator and discriminator networks includes six dilated layers. In this embodiment, the dilated convolutional layers have a dilation rate of 1, 2, 4, 8, 16, and 32. The number of dilated layers and their respective dilation rates may vary according to the hyperparameters selected for the W-GAN and the tuning of those hyperparameters.

In an embodiment, W-GAN hyperparameters include the size of input noise vector Z, e.g., 32; the size of input vector C, e.g., 384; the size of P and R, e.g., 64; the dimension of Z, e.g., 2; the number of dilation filters, e.g., 32; the output size of the first dense (non-dilated) layer of the generator network, e.g., 64; the output size of the second dense layer of the generator network, e.g., 128; the output size of the first dense discriminator network layer, e.g., 1; the generator and discriminator dense layer activation functions, e.g., linear, tan h; and the generator and discriminator loss functions, e.g., binary cross-entropy. The provided examples relate to an embodiment of the invention and are not intended to limit the scope of the disclosed inventions; other values are possible.

At block 120, the method constructs the W-GAN discriminator. The discriminator includes a convolutional neural network also including dilated convolutional layers as described above. The discriminator design receives either fake vector P, or a real vector R, in combination with real input vector C. The discriminator training yields a network which differentiates between the P and R vectors. The dilated discriminator layers receive the combined time-series data vectors concatenated as a single input vector. The dilated layers memorize both global and local features of the concatenated vector inputs.

At block 130, the method combines the generator and discriminator networks as a single W-GAN and adds a loss function to be optimized during the W-GAN training process. In an embodiment, the method defines a W-GAN discriminator loss or value function (1) as:

$$\min_G \max_D V(D,G) = E_{R\text{-}pdata}[\log D(R|C)] + E_{z\text{-}pnoise(z)}[\log(1-D(G(Z|C)))] \quad (1)$$

where the network seeks to concurrently minimize the generator loss function—the ability of the generator output to fool the discriminator, represented here by the log of the inverse of the probability of a fake prediction by the discriminator for the fake input vector, while maximizing the discriminator loss function—the ability of the discriminator to accurately recognize real and fake inputs, represented by the log probability of real input vectors R [log (D(R|C))] and the log of the inverse probability of fake input vectors P [log(1−D(G(Z.|C)))].

At block 140, the method evaluates whether all training epochs have processed. Each training epoch including the sequence of steps: 150, execute forward propagation through the generator and discriminator, compute the W-GAN loss function value; 160, execute backward propagation to train the discriminator—holding generator node weight constant; and 170, fix the discriminator weights and adjust the generator node weights to train the W-GAN generator.

After the balance between minimizing the generator loss term while maximizing the discriminator loss term, all epochs are considered processed at block 140 and training ends. After training ends, the method provides trained W-GAN generator for the purpose of generating time-series data to forecast or extend input time-series data.

A trained model of generative adversarial network (GAN) for causing a computer to function to output multivariate multi-step forecasted time series data includes a generator comprising dilated convolutional layers for receiving multivariate multi-step real time series data as an input (note: a discriminator is an optional component for the trained model), wherein, in a training phase using a discriminator comprising second dilated convolutional layers, the generator receives a first vector representing multivariate multi-step real time-series data of first time period as input, and outputs a second vector representing multivariate multi-step forecasted time-series data of second time period that is subsequent to the first time period; the discriminator receives the first vector and either i) the second vector output from the generator or ii) the third vector representing multivariate multi-step real time-series data of the second time period, as inputs, and discriminates whether the input data is the second vector (forecasted data) or the third vector (real data); weights of the discriminator are trained so as to improve the accuracy of the discrimination result; and then weights of the generator are trained, and where, in an operating (inferring) phase, the model is configured to cause the computer to output multivariate multi-step forecasted time-series data that is temporally subsequent to multivariate multi-step real time-series data input to the dilated convolutional layers of the generator.

The trained model of the present invention is embodied as a computer program module which constitutes a part of artificial intelligence software. The artificial; intelligence software includes a generative adversarial network (GAN) for causing a computer to function to output multivariate multi-step forecasted time series data including a generator comprising dilated convolutional layers for receiving multivariate multi-step real time series data as an input, (note: a discriminator is an optional component for the trained model) wherein, in a training phase using a discriminator comprising second dilated convolutional layers, the generator receives a first vector representing multivariate multi-step real time-series data of first time period as input, and outputs a second vector representing multivariate multi-step forecasted time-series data of second time period that is subsequent to the first time period; the discriminator receives the first vector and either i) the second vector output form the generator or ii) third vector representing multivariate multi-step real time-series data of the second time period, as inputs, and discriminates whether the input data is the second vector (forecasted data) or the third vector (real data); weights of the discriminator are trained so as to improve the accuracy of the discrimination result; and then weights of the generator are trained, and where, in an operating (inferring) phase, the model is configured to cause the computer to output multivariate multi-step forecasted time-series data that is temporally subsequent to multivariate multi-step real time-series data input to the dilated convolutional layers of the generator.

The trained model of the present invention is utilized in a computer equipped with a CPU and a memory. Specifically, the CPU of the computer operates, in accordance with instructions from the trained model stored in the memory, in a way that it performs a generative adversarial network (GAN) causing a computer to function to output multivariate multi-step forecasted time series data including a generator comprising dilated convolutional layers for receiving multivariate multi-step real time series data as an input, (note: a discriminator is an optional component for the trained model) wherein, in a training phase using a discriminator comprising a second set of dilated convolutional layers, the generator receives a first vector including multivariate, multi-step, time-series data of first time period as input, and outputs a second vector representing multivariate, multi-step, forecasted time-series data of second time period that is subsequent to the first time period. The discriminator receives the first vector and either i) the second vector output form the generator or ii) third vector representing multivariate multi-step real time-series data of the second time period, as inputs, and discriminates whether the input data is the second vector (forecasted data) or the third vector (real data); weights of the discriminator are trained so as to improve the accuracy of the discrimination result; and then weights of the generator are trained, and where, in an operating (inferring) phase, the model is configured to cause the computer to output multivariate multi-step forecasted time-series data that is temporally subsequent to multivariate multi-step real time-series data input to the dilated convolutional layers of the generator.

In an embodiment, the method monitors a subject driver's EEG, and inputs the multivariate EEG data, including data for each brain hemisphere, to the trained W-GAN generator network. The generator generates forecast EEG data according to the EEG input data. An analysis module reviews the generator output combined with the real EEG input and predicts skeletal-muscular motor activities of the subject driver according to the generated EEG output. In this embodiment, the analysis module calculates a power value for the generated data of each hemisphere. The analysis module compares the respective hemisphere data power values. In this embodiment, the analysis module provides an output indicating a probable subject driver skeletal-muscular motor activity according to the comparison of hemispherical data power values. Similar power values indicate no skeletal-muscular motor activity for the generated EEG data. In an embodiment, a right hemisphere power value lower than the corresponding left hemisphere power value indicates the subject driver intends to turn right. In this embodiment, a left hemisphere power value lower than the corresponding right hemisphere power value indicates the subject driver intends to turn left.

In an embodiment, the method provided analysis module outputs to a vehicle collision avoidance module. The vehicle collision avoidance module tracks the current location and speed of the vehicle as well as the relative locations and speeds of nearby vehicles. In this embodiment, the collision avoidance module predicts collision events as those instances where the subject vehicle and a nearby vehicle will soon occupy the same space. The vehicle collision module utilizes the analysis module output in predicting the future location of the vehicle by evaluating the future position of the vehicle according to the current location, speed and predicted subject driver skeletal-muscular motor activity; e.g., the subject driver will turn right according to the analysis module output, turning right will initiate a collision with a nearby vehicle, the collision avoidance module may slow the subject vehicle to delay the right turn, or inhibit the vehicle steering control response to input from the subject driver, preventing the right turn and the otherwise imminent collision.

In an embodiment, the analysis module provides output associated with a medical condition of the subject, e.g., epilepsy. In this embodiment, the method evaluates generated EEG data to identify brain activity associated with an impending epileptic seizure. In this embodiment, the analysis module output triggers an alarm alerting the subject to the impending seizure or triggers the release of anti-seizure medication to the subjects bloodstream, or triggers a sub-threshold cortical stimulus to prevent the seizure.

Figure 2:
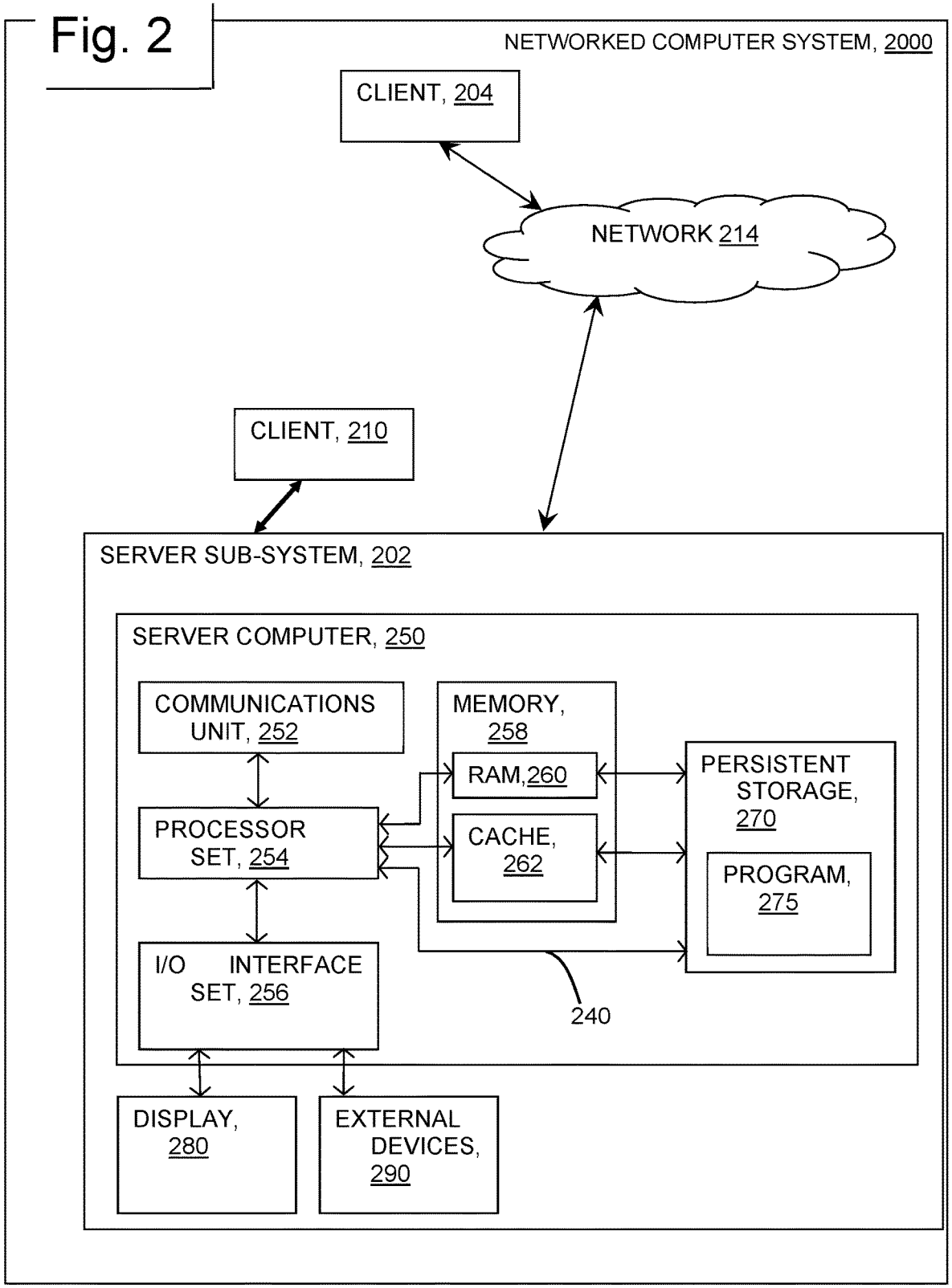
FIG. 2 provides a schematic illustration of a computing environment according to an embodiment of the invention.

FIG. 2 provides a schematic illustration of exemplary network resources associated with practicing the disclosed inventions. The inventions may be practiced in the processors of any of the disclosed elements which process an instruction stream. As shown in the figure, a networked Client device 210 connects wirelessly to server sub-system 202. Client device 204 connects wirelessly to server sub-system 202 via network 214. Client devices 204 and 210 comprise W-GAN program (not shown) together with sufficient computing resource (processor, memory, network communications hardware) to execute the program. In an embodiment, client devices 204 and 210 collect time-series data and provide the collected data to the server sub-system 202 for processing through the trained W-GAN model. In this embodiment, at least one of client devices 204 and 210 receives a W-GAN model forecast analysis from server sub-system 202. As shown in FIG. 2, server sub-system 202 comprises a server computer 250. FIG. 2 depicts a block diagram of components of server computer 250 within a networked computer system 2000, in accordance with an embodiment of the present invention. It should be appreciated that FIG. 2 provides only an illustration of one implementation and does not imply any limitations with regard to the environments in which different embodiments can be implemented. Many modifications to the depicted environment can be made.

Server computer 250 can include processor(s) 254, memory 258, persistent storage 270, communications unit 252, input/output (I/O) interface(s) 256 and communications fabric 240. Communications fabric 240 provides communications between cache 262, memory 258, persistent storage 270, communications unit 252, and input/output (I/O) interface(s) 256. Communications fabric 240 can be implemented with any architecture designed for passing data and/or control information between processors (such as microprocessors, communications and network processors, etc.), system memory, peripheral devices, and any other hardware components within a system. For example, communications fabric 240 can be implemented with one or more buses.

Memory 258 and persistent storage 270 are computer readable storage media. In this embodiment, memory 258 includes random access memory (RAM) 260. In general, memory 258 can include any suitable volatile or non-volatile computer readable storage media. Cache 262 is a fast memory that enhances the performance of processor(s) 254 by holding recently accessed data, and data near recently accessed data, from memory 258.

Program instructions and data used to practice embodiments of the present invention, e.g., the W-GAN model and program 275, are stored in persistent storage 270 for execution and/or access by one or more of the respective processor(s) 254 of server computer 250 via cache 262. In this embodiment, persistent storage 270 includes a magnetic hard disk drive. Alternatively, or in addition to a magnetic hard disk drive, persistent storage 270 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 270 may also be removable. For example, a removable hard drive may be used for persistent storage 270. Other examples include optical and magnetic disks, thumb drives, and smart cards that are inserted into a drive for transfer onto another computer readable storage medium that is also part of persistent storage 270.

Communications unit 252, in these examples, provides for communications with other data processing systems or devices, including resources of client computing devices 204, and 210. In these examples, communications unit 252 includes one or more network interface cards. Communications unit 252 may provide communications through the use of either or both physical and wireless communications links. Software distribution programs, and other programs and data used for implementation of the present invention, may be downloaded to persistent storage 270 of server computer 250 through communications unit 252.

I/O interface(s) 256 allows for input and output of data with other devices that may be connected to server computer 250. For example, I/O interface(s) 256 may provide a connection to external device(s) 290 such as a keyboard, a keypad, a touch screen, a microphone, a digital camera, EEG data collection systems, Internet of things environmental sensors, and/or some other suitable input device. External device(s) 290 can also include portable computer readable storage media such as, for example, thumb drives, portable optical or magnetic disks, and memory cards. Software and data used to practice embodiments of the present invention, e.g., W-GAN program 275 on server computer 250, can be stored on such portable computer readable storage media and can be loaded onto persistent storage 270 via I/O interface(s) 256. I/O interface(s) 256 also connect to a display 280.

Display 280 provides a mechanism to display data to a user and may be, for example, a computer monitor. Display 280 can also function as a touch screen, such as a display of a tablet computer.

Figure 3:
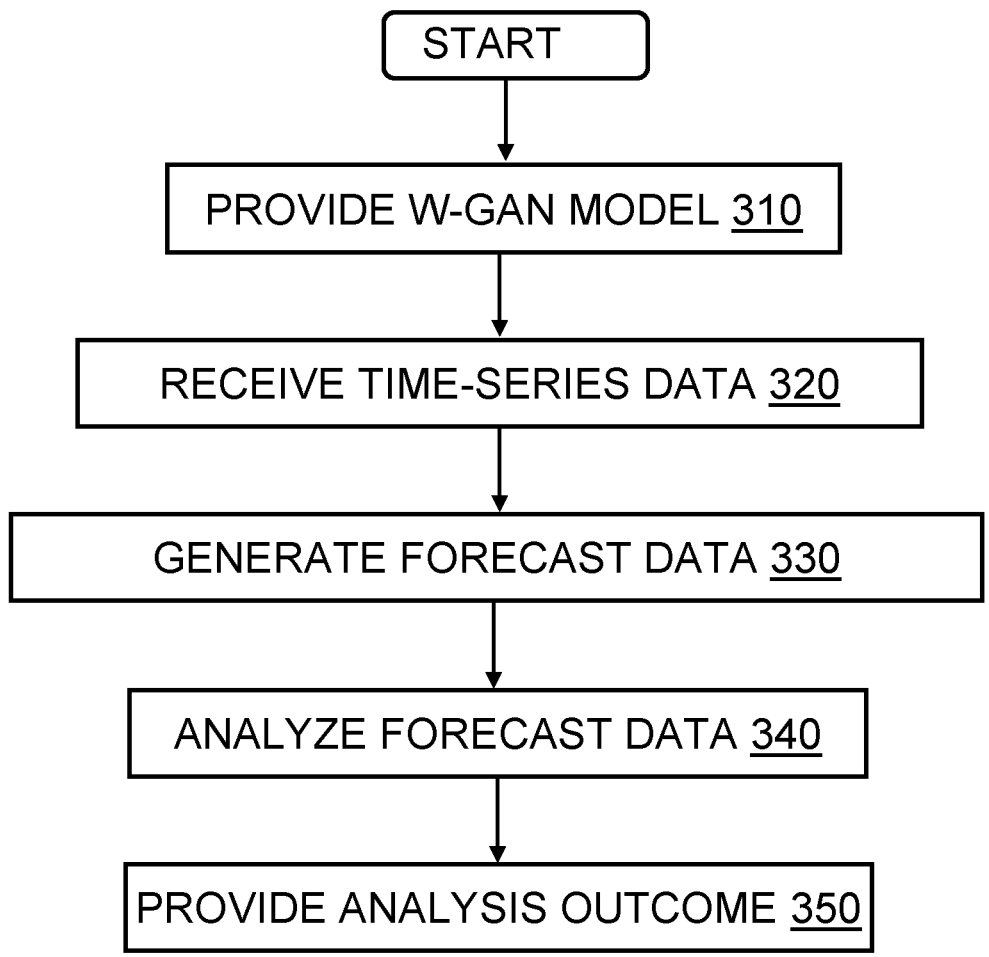
FIG. 3 provides a flowchart depicting an operational sequence, according to an embodiment of the invention.

FIG. 3 provides a flowchart 300, illustrating exemplary activities associated with the practice of the disclosure. After program start, at block 310, the method of W-GAN program 275 provides a trained W-GAN generator network. The trained generator network includes one or more dilated convolutional layers and is configured to receive concatenated time-series data vectors and input noise vectors.

At block 320, the W-GAN program receives real-time, time-series data, including real-time data such as subject EEG and other biometric time-series data. The received data relates to a first time period T1. The method concatenates the real-time data with noise vector data and submits the concatenated data as input to the generator network.

At block 330, the method of W-GAN program generates time series data for the time period $T_{1+}$. The generated data forecasts the next step in the time-series data provided as the input to the generator. The generated data has the same format and content as the real-time data vector provided as an input.

At block 340, an analysis module evaluates the generated output and determines an outcome associated with the generated output. In an embodiment, the outcome relates to one or more skeletal-muscular motor activities of the data subject.

At block 350, the W-GAN analysis module provides the determined outcome as an output, the output serves as an input to a user system such as a health monitoring system, or a vehicle operation and/or collision avoidance system. In an embodiment, the method provides the generated data as the output or in addition to the analysis module output.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
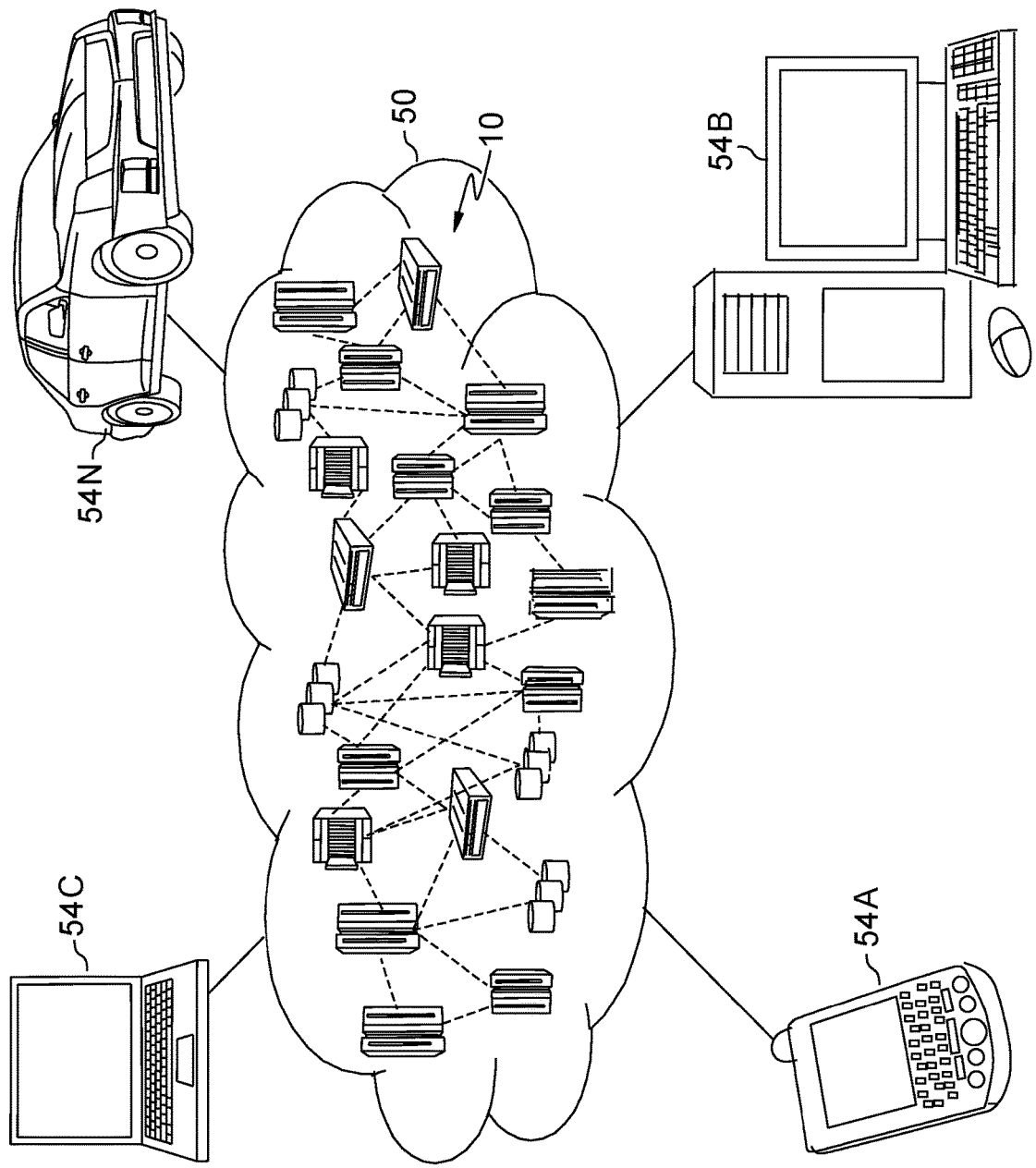
FIG. 4 depicts a cloud computing environment, according to an embodiment of the invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
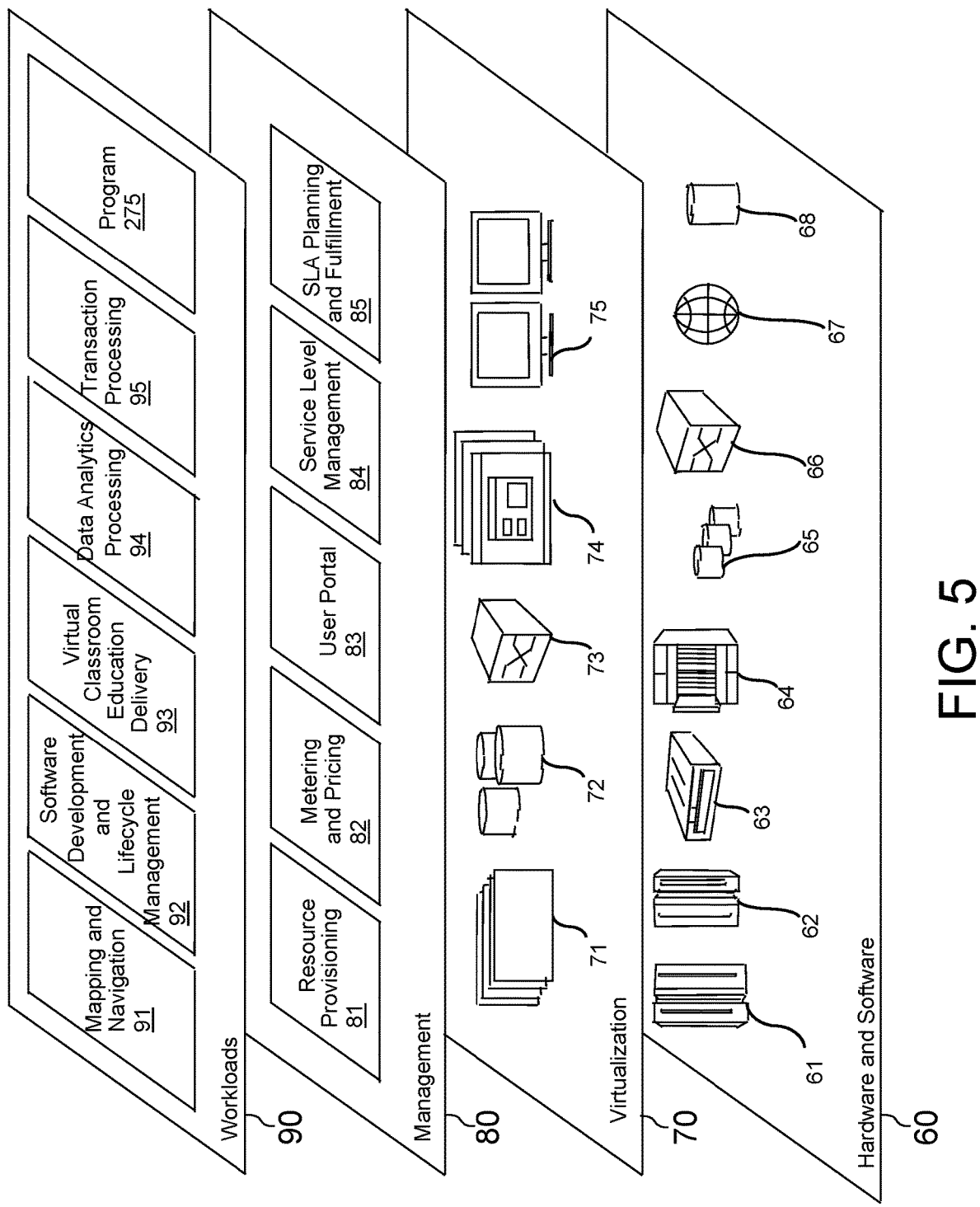
FIG. 5 depicts abstraction model layers, according to an embodiment of the invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and W-GAN program 275.

The present invention may be a system, a method, and/or a computer program product at any possible technical detail level of integration. The invention may be beneficially practiced in any system, single or parallel, which processes an instruction stream. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer implemented method for utilizing a trained generative adversarial network (GAN) model to cause a computer to output multivariate forecasted time-series data, the method comprising:
    providing a trained GAN model, the GAN model comprising dilated convolutional layers for receiving real-time time-series multivariate data;
    receiving multi-step real-time time-series multivariate biometric data of a subject for a first time period;
    generating, by the GAN model, successive multi-step time series multivariate biometric data according to the real-time-series multivariate biometric data;
    determining a subject activity according to the successive multi-step time-series multivariate biometric data; and
    providing an output associated with the subject activity.

2. The computer implemented method according to claim 1, further comprising providing the successive time series multivariate biometric data as the output.

3. The computer implemented method according to claim 1, wherein the subject activity relates to skeletal-muscular motor activity of a subject associated with the successive time-series multivariate biometric data.

4. A computer implemented method for utilizing a trained generative adversarial network (GAN) model to cause a computer to output multivariate forecasted time-series data, the method comprising:

training a GAN model by:
  providing a first vector comprising multivariate time-series data associated with a first time period to a GAN generator of the GAN model;
  generating, using the GAN generator, a second vector comprising multivariate time-series data associated with a second time period;
  providing the first vector and the second vector to a GAN discriminator of the GAN model;
  determining, using the GAN discriminator a discrimination result associated with the second vector; and
  adjusting a node weight of the discriminator according to the discrimination result;
providing the GAN model, the GAN model comprising dilated convolutional layers for receiving real-time-series multivariate data;
receiving real-time time-series multivariate biometric data of a subject for a first time period;
generating, by the GAN model, successive time series multivariate biometric data for a second time period according to the real-time time-series multivariate biometric data;
determining a subject activity according to the successive time-series multivariate biometric data; and
providing an output associated with the subject activity.

5. The computer implemented method according to claim 4, wherein the second time period occurs subsequent to the first time period.

6. The computer implemented method according to claim 4, further comprising adjusting a node weight of the GAN generator subsequent to adjusting the node weight of the discriminator.

7. The computer implemented method according to claim 4, further comprising providing the successive time series multivariate biometric data as the output.

8. The computer implemented method according to claim 4, wherein the subject activity relates to skeletal-muscular motor activity of a subject associated with the successive time-series multivariate biometric data.

9. A computer implemented method for utilizing a trained generative adversarial network (GAN) model to cause a computer to output multivariate forecasted time-series data, the method comprising:
training a GAN model by:
  providing a first vector comprising multivariate time-series data associated with a first time period to a GAN generator of the GAN model;
  generating, using the GAN generator, a second vector comprising multivariate time-series data associated with a second time period;
  providing the first vector and the second vector to a GAN discriminator of the GAN model;
  determining, using the GAN discriminator a first discrimination result associated with the second vector;
  adjusting a node weight of the discriminator according to the first discrimination result;
  providing a third vector comprising multivariate time-series data associated with a second time period to the GAN discriminator;
  determining, using the GAN discriminator, a second discrimination result associated with the third vector; and
  adjusting a node weight of the discriminator according to the second discrimination result;
providing the GAN model, the GAN model comprising dilated convolutional layers for receiving real-time time-series multivariate data;
receiving real-time time-series multivariate biometric data of a subject for a first time period;
generating, by the GAN model, successive time series multivariate biometric data for a second time period according to the real-time time-series multivariate biometric data;
determining a subject activity according to the successive time-series multivariate biometric data; and
providing an output associated with the subject activity.

10. The computer implemented method according to claim 9, wherein the second time period occurs subsequent to the first time period.

11. The computer implemented method according to claim 9, further comprising adjusting a node weight of the GAN generator subsequent to adjusting the node weight of the discriminator.

12. A computer program product for utilizing a trained generative adversarial network (GAN) model for causing a computer to output multivariate forecasted time-series data, the computer program product comprising one or more computer readable storage media and program instructions collectively stored on the one or more computer readable storage media, the stored program instructions comprising:
  program instructions to provide a trained GAN model, the GAN model comprising dilated convolutional layers for receiving real-time time-series multivariate data;
  program instructions to receive real-time time-series multivariate biometric data of a subject for a first time period;
  program instructions to generate, using the GAN model, successive time series multivariate biometric data for a second time period according to the time-series multivariate biometric data;
  program instructions to determine a subject activity according to the successive time-series multivariate biometric data; and
  program instructions to provide an output associated with the subject activity.

13. The computer program product according to claim 12, the stored program instructions further comprising program instructions to train the GAN model including:
  program instructions to provide a first vector comprising multivariate time-series data associated with a first time period to a GAN generator of the GAN model;
  program instructions to generate, using the GAN generator, a second vector comprising multivariate time-series data associated with a second time period;
  program instructions to provide the first vector and the second vector to a GAN discriminator of the GAN model;
  program instructions to determine, using the GAN discriminator, a discrimination results associated with the second vector; and
  program instructions to adjust a node weight of the discriminator according to the discrimination result.

14. The computer program product according to claim 13, wherein the second time period occurs subsequent to the first time period.

15. The computer program product according to claim 13, the stored program instructions further comprising:
  program instructions to provide a third vector comprising multivariate time-series data associated with a second time period to the GAN discriminator;
  program instructions to determine a discrimination results associated with the third vector using the GAN discriminator; and program instructions to adjust a node weight of the discriminator according to the discrimination result.

16. The computer program product according to claim 13, the stored program instructions further comprising program instructions to adjust a node weight of the GAN generator subsequent to adjusting the node weight of the discriminator.

17. The computer program product according to claim 12, the stored program instructions further comprising program instructions to provide the successive time series multivariate biometric data as the output.

18. The computer program product according to claim 12, wherein the subject activity relates to skeletal-muscular motor activity of a subject associated with the successive time-series multivariate biometric data.

19. A computer system for utilizing a trained generative adversarial network (GAN) model for causing a computer to output multivariate forecasted time-series data, the computer system comprising:
one or more computer processors;
one or more computer readable storage devices; and
stored program instructions on the one or more computer readable storage devices for execution by the one or more computer processors, the stored program instructions comprising:
program instructions to provide a trained GAN model, the GAN model comprising dilated convolutional layers for receiving real-time time-series multivariate data;
program instructions to receive real-time, time-series multivariate biometric data of a subject for a first time period;
program instructions to generate, using the GAN model, successive time series multivariate biometric data for a second time period according to the time-series multivariate biometric data;
program instructions to determine a subject activity according to the successive time-series multivariate biometric data; and
program instructions to provide an output associated with the subject activity.

20. The computer system according to claim 19, the stored program instructions further comprising program instructions to train the GAN model including:
program instructions to provide a first vector comprising multivariate time-series data associated with a first time period to a GAN generator of the GAN model;
program instructions to generate, using the GAN generator, a second vector comprising multivariate time-series data associated with a second time period;
program instructions to provide the first vector and the second vector to a GAN discriminator of the GAN model;
program instructions to determine, using the GAN discriminator, a discrimination results associated with the second vector; and
program instructions to adjust a node weight of the discriminator according to the discrimination result.

21. The computer system according to claim 20, wherein the second time period occurs subsequent to the first time period.

22. The computer system according to claim 20, the stored program instructions further comprising:
program instructions to provide a third vector comprising multivariate time-series data associated with a second time period to the GAN discriminator;
program instructions to determine, using the GAN discriminator, a discrimination results associated with the third vector; and
program instructions to adjust a node weight of the discriminator according to the discrimination result.

23. The computer system according to claim 20, the stored program instructions further comprising program instructions to adjust a node weight of the GAN generator subsequent to adjusting the node weight of the discriminator.

24. The computer system according to claim 19, the stored program instructions further comprising program instructions to provide the successive time series multivariate biometric data as the output.

25. The computer system according to claim 19, wherein the subject activity relates to skeletal-muscular motor activity of a subject associated with the successive time-series multivariate biometric data.

* * * * *